(12) United States Patent
Hickam (10) Patent No.: US 7,370,716 B2
(45) Date of Patent: May 13, 2008

(54) MOTOR/GENERATOR

(75) Inventor: Christopher Dale Hickam, Glasford, IL (US)

(73) Assignee: Caterpillar Inc., Peoria, IL (US)

( * ) Notice: Subject to any disclaimer, the term of this patent is extended or adjusted under 35 U.S.C. 154(b) by 57 days.

(21) Appl. No.: 11/141,064

(22) Filed: Jun. 1, 2005

(65) Prior Publication Data

US 2006/0283642 A1 Dec. 21, 2006

(51) Int. Cl.
*B60K 1/00* (2006.01)

(52) U.S. Cl. .................. 180/65.3; 180/65.2; 475/5

(58) Field of Classification Search .......... 180/65.2, 180/65.3, 65.4, 65.6, 65.8; 903/906, 909, 903/914; 310/68 B, 261, 74; 192/3.29, 192/3.3; 475/5, 72, 26

See application file for complete search history.

(56) References Cited

U.S. PATENT DOCUMENTS

| | | | |
|---|---|---|---|
| 4,346,773 A * | 8/1982 | Hofbauer et al. ............ 180/165 |
| 4,734,590 A * | 3/1988 | Fluegel ........................ 475/72 |
| 5,620,387 A | 4/1997 | Janiszewski |
| 5,773,904 A | 6/1998 | Schiebold et al. |
| 5,796,195 A * | 8/1998 | Miyakawa ................. 310/68 B |
| 6,048,289 A | 4/2000 | Hattori et al. |
| 6,133,659 A | 10/2000 | Rao |
| 6,176,808 B1 | 1/2001 | Brown et al. |
| 6,258,001 B1 * | 7/2001 | Wakuta et al. ................. 475/5 |
| 6,364,807 B1 | 4/2002 | Koneda et al. |
| 6,629,027 B2 | 9/2003 | Yamaguchi et al. |
| 6,729,423 B2 * | 5/2004 | Kobayashi et al. ......... 180/65.3 |
| 7,114,604 B2 * | 10/2006 | Masuya ...................... 192/3.29 |
| 2004/0069547 A1 | 4/2004 | Hoetzer et al. |
| 2004/0099454 A1 | 5/2004 | Hughes |
| 2004/0211605 A1 | 10/2004 | Botti |

FOREIGN PATENT DOCUMENTS

| | | |
|---|---|---|
| EP | 1426599 A1 | 6/2004 |
| GB | 2348630 A | 3/2000 |
| WO | WO 00/31411 | 6/2000 |

OTHER PUBLICATIONS

Eaton Corporation et al., "Hybrid Truck Users Forum," (Oct. 14-15, 2004).
International Organization for Standardization, ISO 7648—Flywheel Housings for Reciprocating Internal Combustion Engines—Nominal Dimensions and Tolerances, 1987.
International Organization for Standardization, ISO 7649—Clutch Housings for Reciprocating Internal Combustion Engines—Nominal Dimensions and Tolerances, 1991.
Society of Automotive Engineers, Inc. SAE® J617—Engine Flywheel Housing and Mating Transmission Housing Flanges, May 1992.
Society of Automotive Engineers, Inc. SAE® J1172—Engine Flywheel Housings With Sealed Flanges, May 1993.
Society of Automotive Engineers, Inc. SAE® J1463—Pull-Type Clutch Transmission Installation Dimensions, May 1992.

* cited by examiner

*Primary Examiner*—Hau Phan
(74) *Attorney, Agent, or Firm*—Finnegan, Henderson, Farabow, Garrett & Dunner (57) ABSTRACT

A motor/generator is provided for connecting between a transmission input shaft and an output shaft of a prime mover. The motor/generator may include a motor/generator housing, a stator mounted to the motor/generator housing, a rotor mounted at least partially within the motor/generator housing and rotatable about a rotor rotation axis, and a transmission-shaft coupler drivingly coupled to the rotor. The transmission-shaft coupler may include a clamp, which may include a base attached to the rotor and a plurality of adjustable jaws.

25 Claims, 10 Drawing Sheets

| Flywheel Housing Category | Diameter 86/90 of Mounting Surface 70/72 (millimeters) | Diameter 88/92 of Mounting-Hole Circle 79/84 (millimeters) | Number of Mounting Holes 74/76 |
|---|---|---|---|
| 6 | 266.70 | 285.75 | 8 |
| 5 | 314.32 | 333.38 | 8 |
| 4 | 361.95 | 381.00 | 12 |
| 3 | 409.58 | 428.62 | 12 |
| 2 | 447.68 | 466.72 | 12 |
| 1 | 511.18 | 530.22 | 12 |
| 1/2 | 584.2 | 619.12 | 12 |
| 0 | 647.70 | 679.45 | 16 |
| 00 | 784.4 | 850.90 | 16 |

MOTOR/GENERATOR

GOVERNMENT RIGHTS

This invention was made with Government support under the terms of Contract No. DE-FC26-04NT42258 awarded by the Department of Energy. The Government may have certain rights in this invention.

TECHNICAL FIELD

The present disclosure relates to motor/generators and, more particularly, to motor/generators used in drive trains.

BACKGROUND

Many systems include a drive train with a prime mover for producing power and a transmission for altering the form of the power produced by the prime mover and transmitting the power to other components of the system. For example, vehicles may include a prime mover, such as an internal combustion engine, for producing power and a transmission, such as a step-change mechanical transmission, for receiving power from the prime mover and transmitting the power to other components of the vehicle at a speed different from which the prime-mover produces the power. Adding a motor/generator to such a drive train may allow for operating the drive train with increased efficiency. However, many existing drive trains do not include a motor/generator and are not well adapted for the addition of a motor/generator.

At least one motor/generator has been disclosed with provisions for adding the motor/generator to at least one configuration of an existing drive train. For example, U.S. Pat. No. 6,133,659 ("the '659 patent") shows a motor/generator mounted between an engine and a transmission. The motor/generator of the '659 patent includes a housing that is attached at one end to the engine and at the other end to the transmission. The motor/generator further includes a rotor and a stator. One end of the rotor of the motor/generator is bolted directly to the crankshaft of the engine. A coupling in the form of a plate connects to the other end of the rotor of the motor/generator. The coupling also attaches to a planar surface of an input shaft of the transmission, thereby attaching the rotor of the motor/generator to the input shaft of the transmission.

Although the motor/generator of the '659 patent is adapted for connection between the engine and transmission of some existing drive trains, the design includes disadvantages. Because the rotor is bolted directly to the crankshaft of the engine, the motor/generator may impose undesirable loads on the bearings that support the crankshaft. Additionally, bolting the rotor of the motor/generator directly to the crankshaft of the engine limits flexibility in operating the drive train, as the crankshaft of the engine and the rotor of the motor/generator cannot be rotated independent from one another. Furthermore, the design only provides for connecting the rotor of the motor/generator to a planar mounting surface of a transmission input shaft, and many transmission input shafts do not include such planar mounting surfaces.

The motor/generator of the present disclosure solve one or more of the problems set forth above.

SUMMARY OF THE INVENTION

One disclosed embodiment is a motor/generator for connecting between a transmission input shaft and an output shaft of a prime mover. The motor/generator may include a motor/generator housing, a stator mounted to the motor/generator housing, a rotor mounted at least partially within the motor/generator housing and rotatable about a rotor rotation axis, and a transmission-shaft coupler drivingly coupled to the rotor. The transmission-shaft coupler may include a clamp, which may include a base attached to the rotor and a plurality of adjustable jaws.

Another embodiment relates to a method of assembling a drive train. The drive train may include a transmission with a transmission housing and a transmission input shaft, a prime mover with an output shaft, and a motor/generator. The motor/generator may include a motor/generator housing and a rotor that may be mounted at least partially within the motor/generator housing and rotatable about a rotor rotation axis. The method may include connecting the rotor to the transmission input shaft and connecting the rotor to the output shaft of the prime mover. Additionally, the method may include mounting the motor/generator housing to the transmission housing by mounting an adapter component to the motor/generator housing and mounting the adapter component the transmission housing.

A further embodiment relates to a drive train that may include a prime mover, a variable-slip drive-train coupler engaged to an output shaft of the prime mover, a transmission with an input shaft, and a motor/generator. The motor/generator may include a motor/generator housing, a stator mounted to the motor/generator housing, and a rotor. The rotor may be mounted at least partially within the motor/generator housing and may be rotatable about a rotor rotation axis. Additionally, the motor/generator may include a motor/generator input shaft that may be drivingly coupled to the rotor. The motor/generator input shaft may also be engaged to an interior surface of an output hub of the variable-slip drive-train coupler in such a manner to drivingly couple the motor/generator input shaft and the output hub. Furthermore, the rotor may be drivingly coupled to the transmission input shaft.

DETAILED DESCRIPTION

Figure 1:
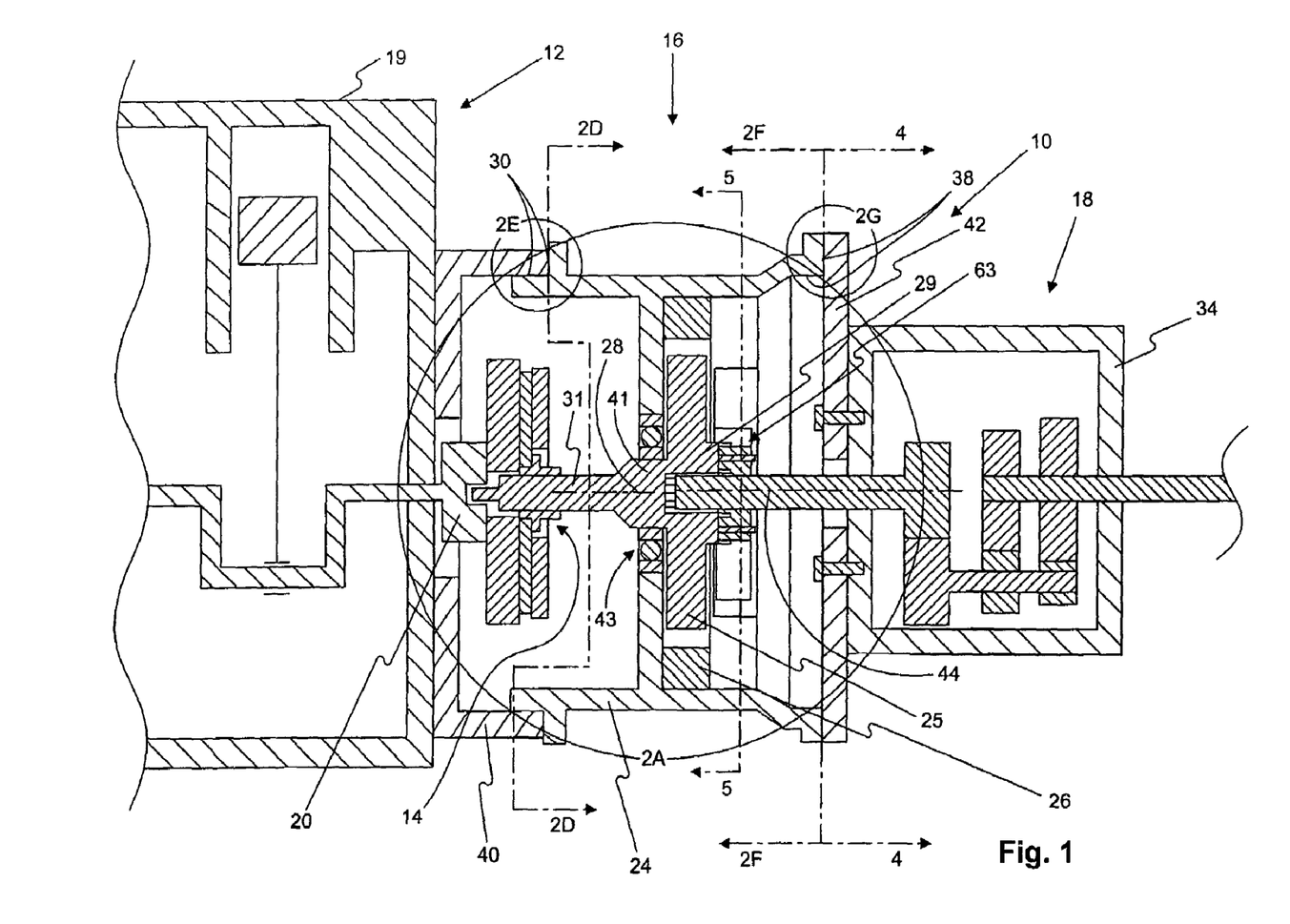
FIG. 1 is a sectional illustration of one embodiment of a drive train with a motor/generator according to the present disclosure.

FIG. 1 provides a sectional view of a drive train 10. Drive train 10 may include a prime mover 12, a variable-slip drive-train coupler 14, a motor/generator 16, and a transmission 18. Prime mover 12 may be any device configured to produce power by rotating an output shaft 20. For example, prime mover 12 may be a diesel engine, a gasoline engine, a gaseous fuel driven engine, a turbine, a hydraulic motor, or an electric motor. In addition to output shaft 20, prime mover 12 may include a prime-mover housing 19, such as an engine block.

Variable-slip drive-train coupler 14 may be any type of component commonly used to provide a variable-slip connection between output shafts of prime movers and transmission input shafts of transmissions. As is shown in FIG. 1, variable-slip drive-train coupler 14 may be a selectively-engageable clutch. Alternatively, variable-slip drive-train coupler 14 may be a fluid coupling, such as a torque converter.

Motor/generator 16 may include a motor/generator housing 24, a rotor 25, a stator 26, clamp 63, a transmission-shaft coupler 29, and a motor/generator input shaft 31. Motor/generator housing 24 may mount to prime-mover housing 19 through prime-mover-mounting features 30 included in motor/generator housing 24. Motor/generator housing 24 may mount to a transmission housing 34 of transmission 18 through transmission-mounting features 38. As is shown in FIG. 1, motor/generator housing 24 may mount to prime-mover housing 19 and transmission housing 34 through a first adapter component 40 and a second adapter component 42, respectively. Alternatively, motor/generator housing 24 may mount directly to prime-mover housing 19 and/or transmission housing 34. Stator 26 may be mounted to motor/generator housing 24. Additionally, rotor 25 may be mounted to motor/generator housing 24 in a manner allowing rotation of rotor 25 about a rotor rotation axis 28. For example, rotor 25 may include a journal 41 disposed within a ball bearing 43 mounted to motor/generator housing 24. Rotor rotation axis 28 may be substantially aligned with output shaft 20 of prime mover 12 and a transmission input shaft 44 of transmission 18. Alternatively, rotor rotation axis 28 may be disposed parallel to or at an angle to output shaft 20 and/or transmission input shaft 44. Motor/generator input shaft 31 may connect rotor 25 to variable-slip coupler 14 and, thus, to output shaft 20 of prime mover 12. Similarly, transmission-shaft coupler 29 may connect rotor 25 to transmission input shaft 44.

Transmission 18 may be any type of component configured to receive power through transmission input shaft 44 and apply that power to a load, which load may include wheels (not shown) or other ground-engaging components of a vehicle (not shown). Transmission 18 may be a step-change mechanical transmission, as is shown in FIG. 1. Alternatively, transmission 18 may be other types of components including, but not limited to, continuously-variable mechanical transmissions, hydrostatic transmissions, and hydraulic pumps for hydraulic drive systems.

Figure 2A:
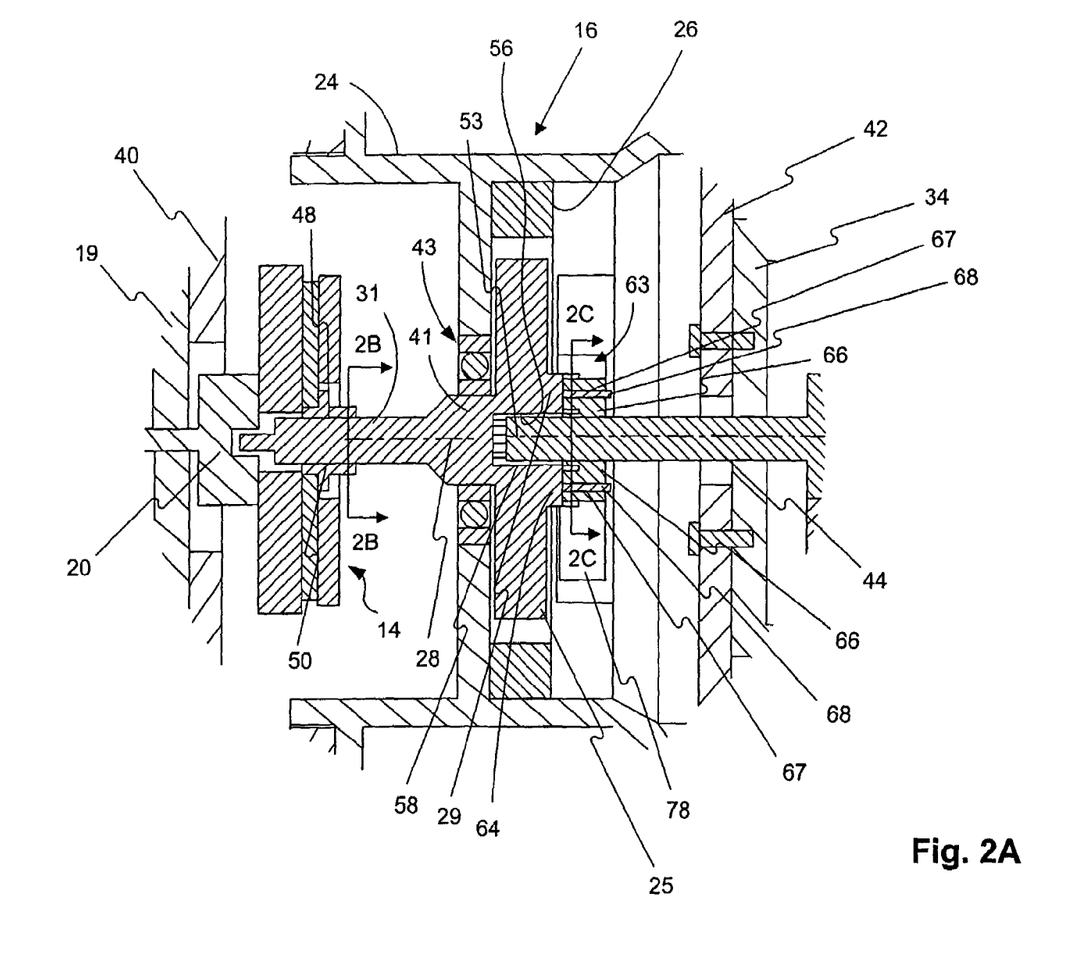
FIG. 2A is a close-up illustration of the portion of FIG. 1 shown in circle 2A of FIG. 1.
Figure 2B:
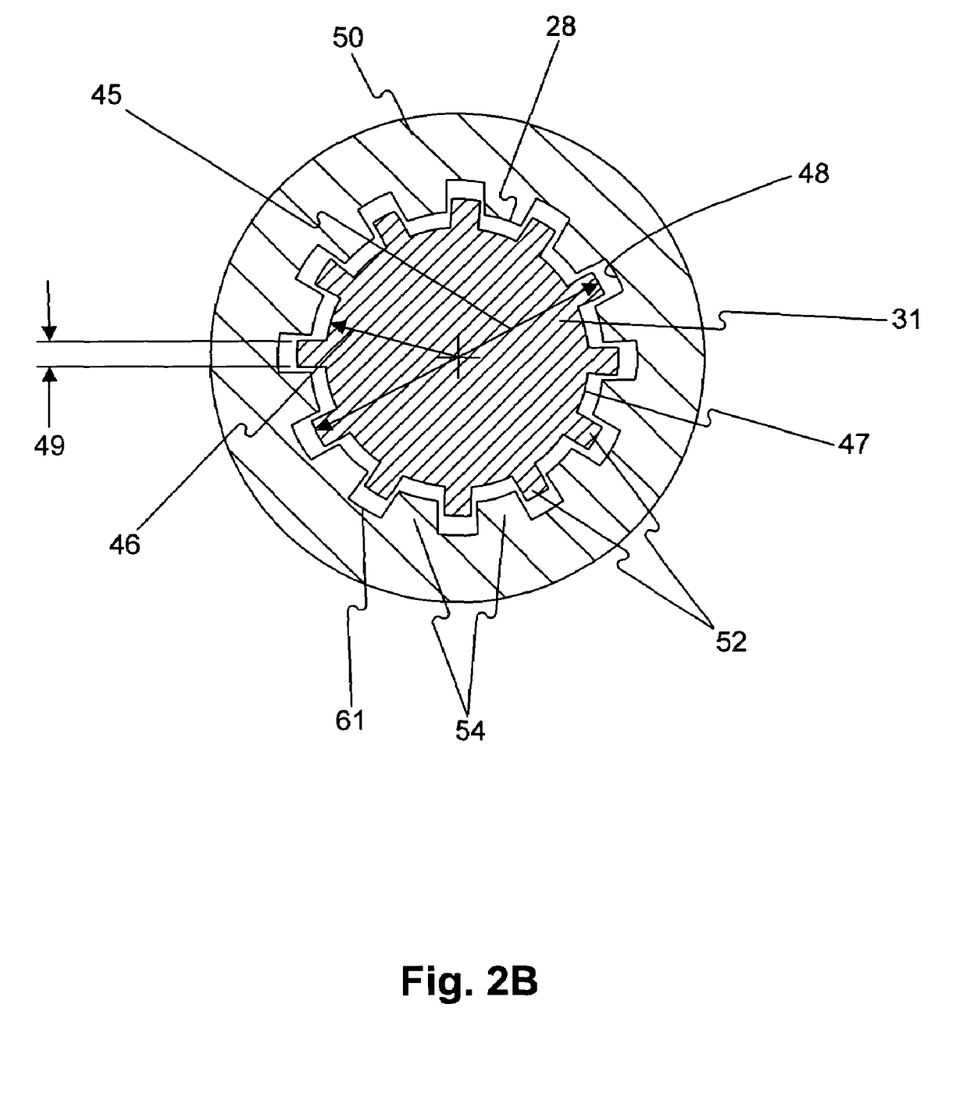
FIG. 2B is a sectional illustration of the embodiment shown in FIGS. 1 and 2A, through line 2B-2B of FIG. 2A.
Figure 2C:
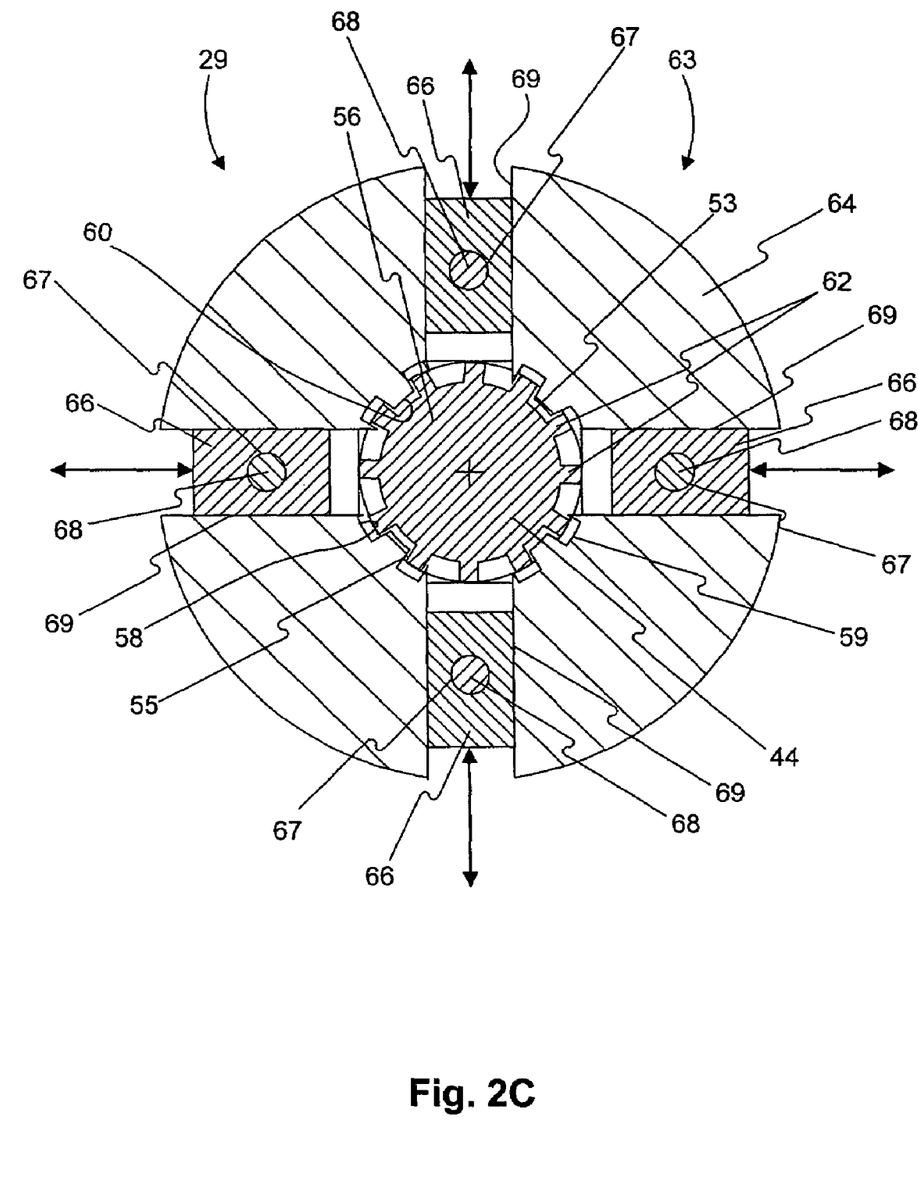
FIG. 2C is a sectional illustration of the embodiment shown in FIGS. 1, 2A, and 2B, through line 2C-2C of FIG. 2A.

FIGS. 2A-2C show rotor 25, transmission-shaft coupler 29, motor/generator input shaft 31, and their engagements to one another and to variable-slip drive-train coupler 14 and transmission input shaft 44 in greater detail. As is shown in FIG. 2B, circumference 47 of motor/generator input shaft 31 may engage an interior surface 48 of an output hub 50 of variable-slip drive-train coupler 14 in such a manner to drivingly couple motor/generator input shaft 31 and output hub 50 about rotor rotation axis 28. Motor/generator input shaft 31 may be drivingly coupled to rotor 25, such that rotation of motor/generator input shaft 31 causes rotation of rotor 25 about rotor rotation axis 28. Motor/generator input shaft 31 may be fixedly attached to rotor 25 and may extend along rotor rotation axis 28. In some such embodiments, motor/generator input shaft 31 may be formed integrally with other portions of rotor 25. As is best shown in FIG. 2B, motor/generator input shaft 31 may include a plurality of splines 52 extending axially along and distributed around motor/generator input shaft 31. Splines 52 may engage a plurality of splines 54 of interior surface 48 of output hub 50.

In some embodiments, motor/generator input shaft 31 may be configured in accordance with one or more SAE® standards for transmission input shafts. For example, motor/generator input shaft 31 may be configured in accordance with SAE® standard J1463 for pull-type clutch transmission installation dimensions. In such embodiments, motor/generator input shaft 31 may have 10 splines 52. Additionally, in such embodiments, the portion of motor/generator input shaft 31 that includes splines 52 may have a major diameter 45 within one of two ranges. In such embodiments, major diameter 45 may either be 43.917-44.221 millimeters or it may be 50.267-50.723 millimeters. In embodiments wherein the portion of motor/generator input shaft 31 that includes splines 52 has a major diameter of 43.917-44.221 millimeters, the portion of motor/generator input shaft 31 that includes splines 52 may have a minor radius 46 of approximately 17.932 millimeters, and splines 52 may have a width 49 of 6.782-6.832 millimeters. Additionally, in such embodiments, motor/generator input shaft 31 may have a cylindrical portion with a diameter of 44.171-44.221 millimeters, axially inboard of the portion that includes splines 52. In embodiments wherein the portion of motor/generator input shaft 31 that includes splines 52 has a major diameter of 50.267-50.723 millimeters, minor radius 46 may be approximately 20.422 millimeters, and width 49 of splines 52 may be 7.772-7.823 millimeters. Additionally, in such embodiments, motor/generator input shaft 31 may have a cylindrical portion with a diameter of 50.673-50.723 millimeters, axially inboard of the portion that includes splines 52.

Motor/generator input shaft 31 and its relationships to variable-slip drive-train coupler 14 and rotor 25 are not limited to the configuration shown in FIGS. 2A and 2B. For example, motor/generator input shaft 31 may be connected to rotor 25 through power-transfer components such as gears, belts, and chains, and motor/generator input shaft 31 may be disposed parallel to or at an angle with respect to rotor rotation axis 28. Additionally, circumference 47 of motor/generator input shaft 31 and interior surface 48 of output hub 50 may have other complementary non-circular shapes that drivingly couple motor/generator input shaft 31 and output hub 50. Additionally, in some embodiments, circumference 47 of motor/generator input shaft 31 and interior surface 48 of output hub 50 may have circular shapes, and other provisions, such as a pin through output hub 50 and motor/generator input shaft 31, may be implemented for drivingly coupling motor/generator input shaft 31 and output hub 50. Moreover, motor/generator input shaft 31 may be drivingly coupled to variable-slip drive-train coupler 14 in manners other than through engagement to output hub 50.

Transmission-shaft coupler 29 may be drivingly coupled to rotor 25, such that rotation of rotor 25 about rotor rotation axis 28 causes rotation of transmission-shaft coupler 29. Transmission-shaft coupler 29 may be fixedly attached to rotor 25. In some such embodiments, some or all of transmission-shaft coupler 29 may be integrally formed with other portions of rotor 25. Alternatively, transmission-shaft coupler 29 may be coupled to rotor 25 through power-transfer components, such as shafts, gears, pulleys, belts, and chains.

Additionally, transmission-shaft coupler 29 may be drivingly coupled to transmission input shaft 44. Transmission-shaft coupler 29 may include a transmission-shaft recess 56 that extends along a transmission-shaft axis 53. Transmission-shaft axis 53 may be substantially aligned with rotor rotation axis 28. Alternatively, transmission-shaft axis 53 may be parallel to or at an angle with respect to rotor rotation axis 28. A portion of transmission input shaft 44 may be disposed within transmission-shaft recess 56. As is best shown in FIG. 2C, a surface 58 of transmission-shaft recess 56 may engage a circumference 55 of transmission input shaft 44 in such a manner to drivingly couple transmission-input shaft coupler 29 and transmission input shaft 44. Surface 58 of transmission-shaft recess 56 may include a plurality of splines 60 that extend substantially parallel to transmission-shaft axis 53 and are distributed substantially uniformly around the transmission-shaft axis 53. Splines 60 may engage splines 62 of transmission input shaft 44. In some embodiments, transmission input shaft 44 may be configured in accordance with one or more SAE® standards for transmission input shafts. For example, transmission input shaft 44 may be configured in accordance with SAE® standard J1463, which is discussed in greater detail above in connection with motor/generator input shaft 31. In some embodiments, surface 58 of transmission-shaft recess 56 may have a press fit with transmission input shaft 44.

As can be seen by comparing FIGS. 2B and 2C, in some embodiments, motor/generator input shaft 31 and transmission input shaft 44 may be configured such that each could drivingly engage interior surface 48 of output hub 50. In some such embodiments, circumference 47 of motor/generator input shaft 31 may have substantially the same shape and size as circumference 55 of transmission input shaft 44. For example, splines 52 of motor/generator input shaft 31 may have the same shape, size, and arrangement as splines 62 of transmission input shaft 44. Additionally, in some embodiments, circumference 47 and circumference 55 may have different sizes and/or shapes, yet motor/generator input shaft 31 and transmission input shaft 44 may each be capable of drivingly engaging interior surface 48 of output hub 50. For example, motor/generator shaft 31 shown in FIG. 2B could omit one or more of splines 52 and still drivingly engage interior surface 48 of output hub 50.

Similarly, surface 58 of transmission-shaft recess 56 and interior surface 48 of output hub 50 may be configured such that surface 58 and interior surface 48 could each drivingly engage transmission input shaft 44. In some such embodiments, a circumference 59 of surface 58 may have substantially the same shape and size as a circumference 61 of interior surface 48 of output hub 50. Additionally, circumference 59 of surface 58 and circumference 47 of motor/generator input shaft 31 may have mating shapes and sizes. In such embodiments, if motor/generator input shaft 31 were separated from motor/generator 16, motor/generator input shaft 47 could drivingly engage surface 58 of transmission-shaft recess 56.

In addition to transmission-shaft recess 56, transmission-shaft coupler 29 may include a clamp 63. FIGS. 2A and 2C show one configuration of clamp 63 and its engagement with transmission input shaft 44. Clamp 63 may have a base 64, a plurality of jaws 66, and one or more locks 68. Base 64 may support jaws 66 in spaced relationship to and at different circumferential positions around transmission-shaft axis 53. As is shown in FIG. 2C, each jaw 66 may be located by a track 69 that extends away from transmission-shaft axis 53, such that each jaw 66 is slideable along track 69 toward and away from transmission-shaft axis 53. Additionally, in some embodiments, clamp 63 may include at least three jaws 66 disposed at different angular positions around transmission-shaft axis 53.

One or more adjusting mechanisms (not shown) may allow for the adjustment of jaws 66 toward and away from transmission-shaft axis 53, either independently or in concert. For example, clamp 63 may include an adjusting screw (not shown) for each of jaws 66. Each adjusting screw may extend substantially parallel to the track 69 of a respective jaw 66, and the adjusting screw may be allowed to rotate around its own axis, but fixed against translation with respect to base 64 of clamp 63. Each respective jaw 66 may include female threads that engage the threads of its adjusting screw, such that rotating the adjusting screw around its axis drives the jaw 66 toward or away from the transmission-shaft axis 53.

Clamp 63 may fix transmission-shaft coupler 29 to transmission input shaft 44. Base 64 may be engaged to other portions of transmission-shaft coupler 29 in such a manner to prevent relative movement therebetween. As is shown in FIG. 2A, base 64 may be fixedly attached to other portions of transmission-shaft coupler 29. Additionally, jaws 66 may press against transmission input shaft 44, thereby fixing base 64 and transmission-shaft coupler 29 against movement with respect to transmission input shaft 44. Thus, in embodiments wherein transmission-shaft coupler 29 is fixedly engaged to rotor 25, clamp 63 may prevent relative movement between transmission input shaft 44 and rotor 25.

Each lock 68 may be any type of component that is operable, when activated, to fix one or more of jaws 66 with respect to base 64. For example, as is shown in FIG. 2A, each lock 68 may be a set screw threaded into a bottomless threaded bore 67 in a respective jaw 66. When threaded all the way through bottomless threaded bore 67, each set screw may press against a surface of base 64, thereby fixing the jaw 66 that hosts the set screw with respect to base 64.

Clamp 63 and its engagement to transmission input shaft 44 and other portions of transmission-shaft coupler 29 are not limited to the configuration illustrated in FIGS. 2A and 2C. For example, rather than base 64 attaching directly to other portions of transmission-shaft coupler 29, clamp 63 may include jaws 66 that clamp to other portions of transmission-shaft coupler 29, in addition to jaws 66 that clamp to transmission input shaft 44. Additionally, in some embodiments, base 64 may press against transmission input shaft 44 and, thus, constitute a jaw 66 in itself. In some such embodiments, clamp 63 may include only one jaw 66 other than base 64. Furthermore, jaws 66 may be engaged to base 64 through means other than tracks 69, such as flexible members or hinges, including living hinges. Additionally clamp 63 may include other types of adjusting mechanisms, such as rack-and-pinion devices, worm-gear devices, camming devices, spur gears, and various types of linkages, in addition to, or in place of adjusting screws. Moreover, in addition to, or in place of, set screws, clamp 63 may include other types of locks 68, such as wedges and detents.

Figure 2D:
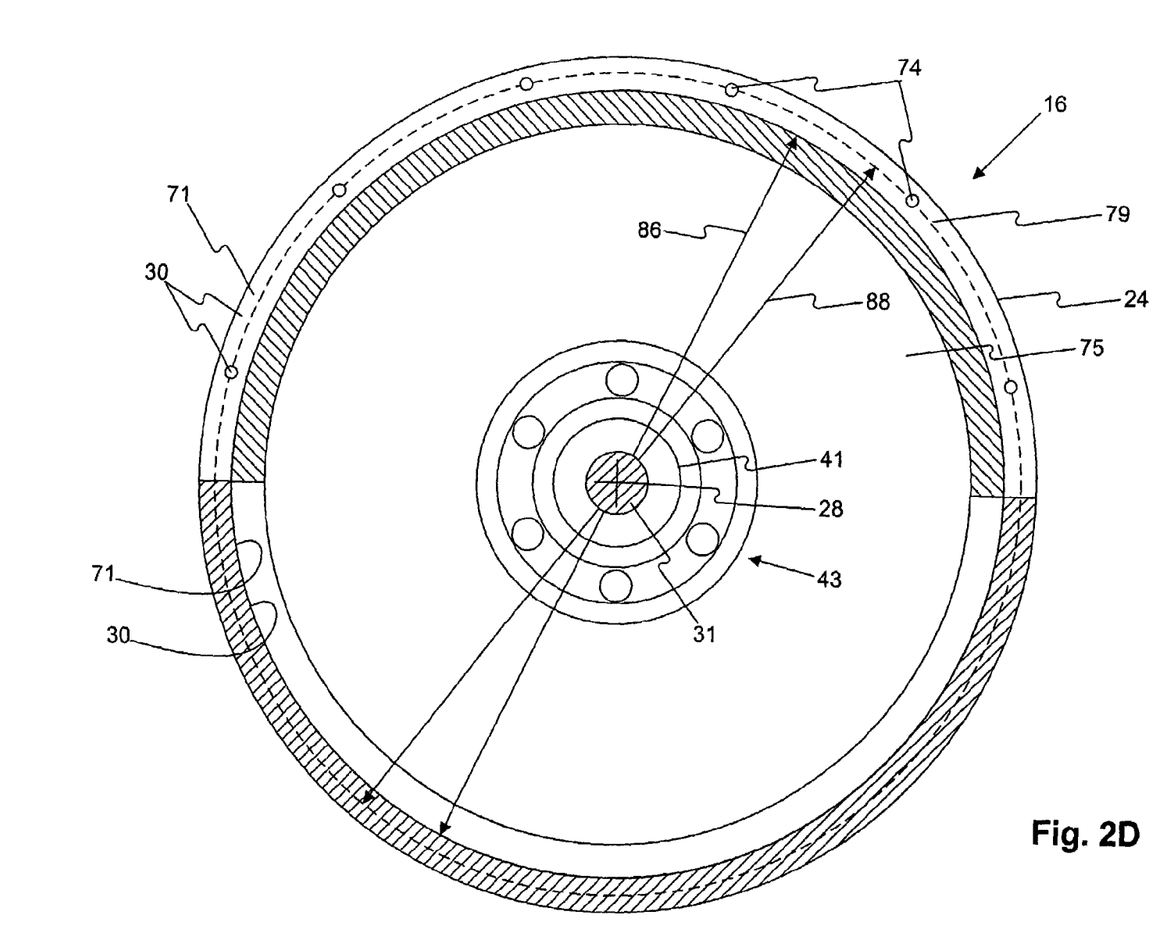
FIG. 2D is a sectional illustration of the embodiment shown in FIGS. 1 and 2A-2C, through line 2D-2D of FIG. 1.
Figure 2E:
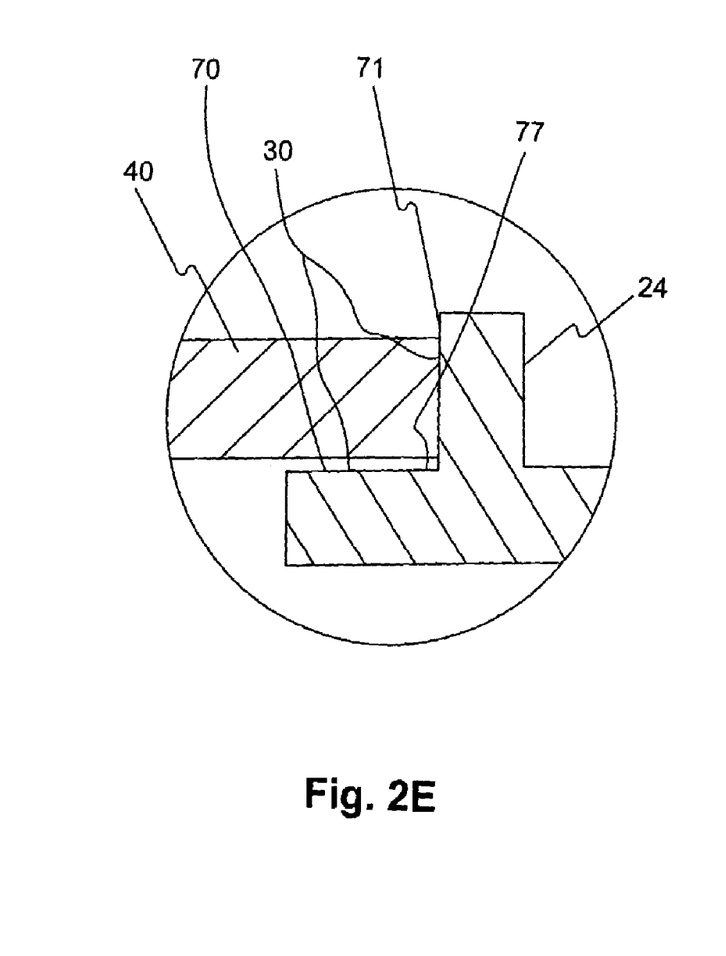
FIG. 2E is a close-up illustration of the portion of FIG. 1 shown in circle 2E of FIG. 1.
Figure 2F:
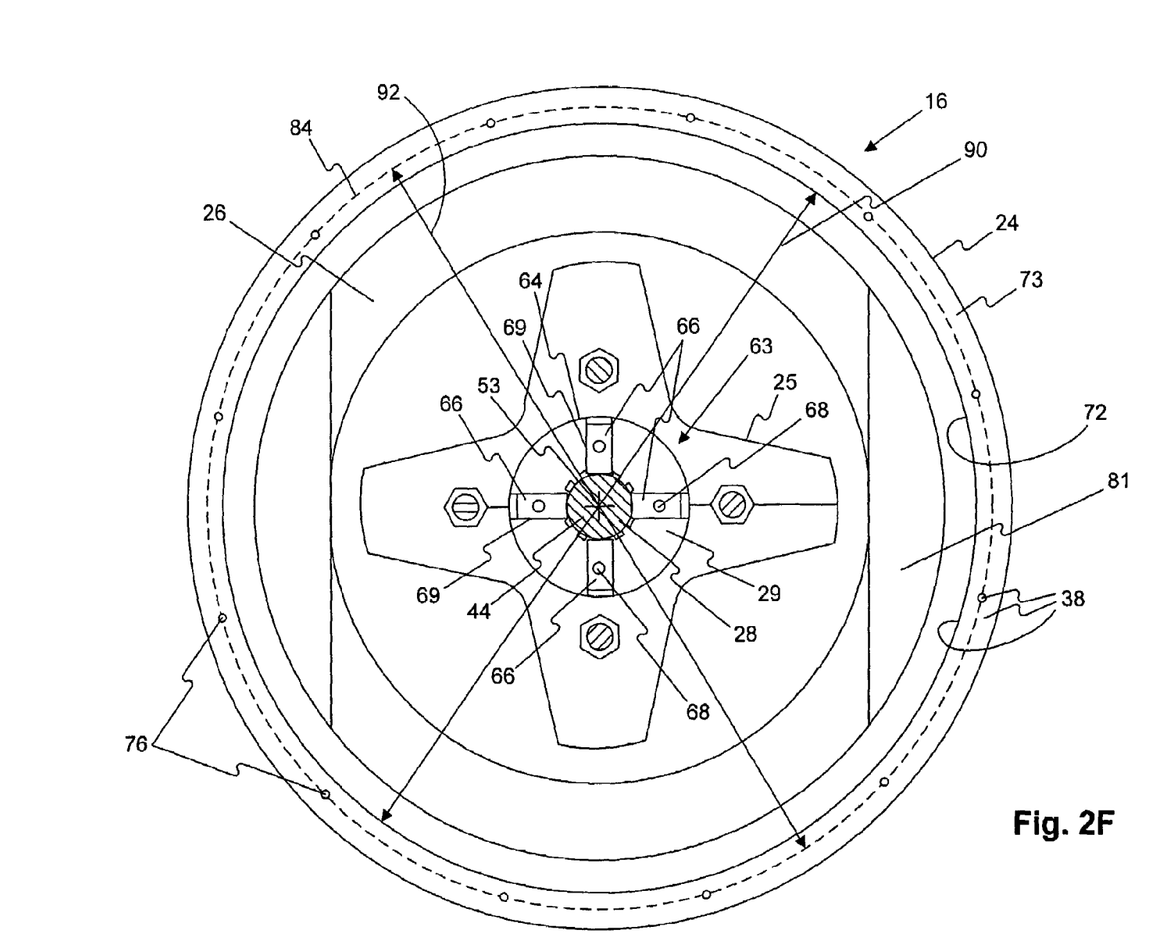
FIG. 2F is a sectional illustration of the embodiment shown in FIGS. 1 and 2A-2E, through line 2F-2F of FIG. 1.
Figure 2G:
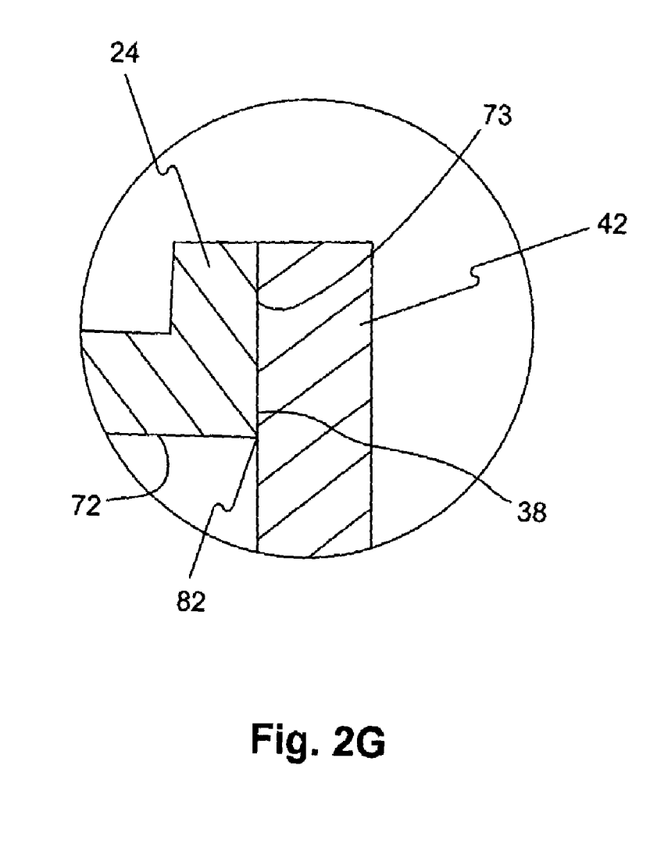
FIG. 2G is a close-up illustration of the portion of FIG. 1 shown in circle 2G of FIG. 1.

FIGS. 2D-2F show prime-mover-mounting features 30 and transmission-mounting features 38, respectively, in greater detail. Prime-mover-mounting features 30 and transmission-mounting features 38 may each include one or more mounting surfaces 70, 71, 72, 73 and one or more mounting holes 74, 76. Mounting surfaces 70 and 71 may extend partially or fully around an opening 75 in motor/generator housing 24. Similarly, mounting surfaces 72 and 73 may extend partially or fully around an opening 81 in motor/generator housing 24. Additionally, in some embodiments, prime-mover-mounting features 30 and/or transmission-mounting features 38 may include one or more threaded or unthreaded studs or projections in addition to, or in place of, mounting holes 74, 76.

In some embodiments, prime-mover-mounting features 30 may be configured in accordance with SAE® or ISO (International Organization for Standardization) standards for flywheel housings, clutch housings, or transmission housings. For example, prime-mover-mounting features 30 may be configured in accordance with at least one of SAE® standard J617 for transmission housing flanges and/or ISO standard ISO 7649 for clutch housings. In such embodiments, mounting surface 70 may be an outward-facing cylindrical surface and mounting surface 71 may be a planar surface that extends radially-outward from an inner end 77 of mounting surface 70. Additionally, in such embodiments, mounting holes 74 may be arranged in a mounting-hole circle 79 substantially concentric to mounting surface 70 and at equal angular intervals thereabout.

Furthermore, transmission-mounting features 38 may be configured in accordance with at least one of SAE® standard J617 for flywheel housings, SAE® standard J1172 for flywheel housings with sealed flanges, and/or ISO standard ISO 7648 for flywheel housings. In such embodiments, mounting surface 72 may be an inward-facing cylindrical surface and mounting surface 73 may be a planar surface extending radially-outward from adjacent an outer end 82 of mounting surface 72. Additionally, in such embodiments, mounting holes 76 may be arranged in a mounting-hole circle 84 substantially concentric to mounting surface 72 and at equal angular intervals thereabout.

Figure 3:
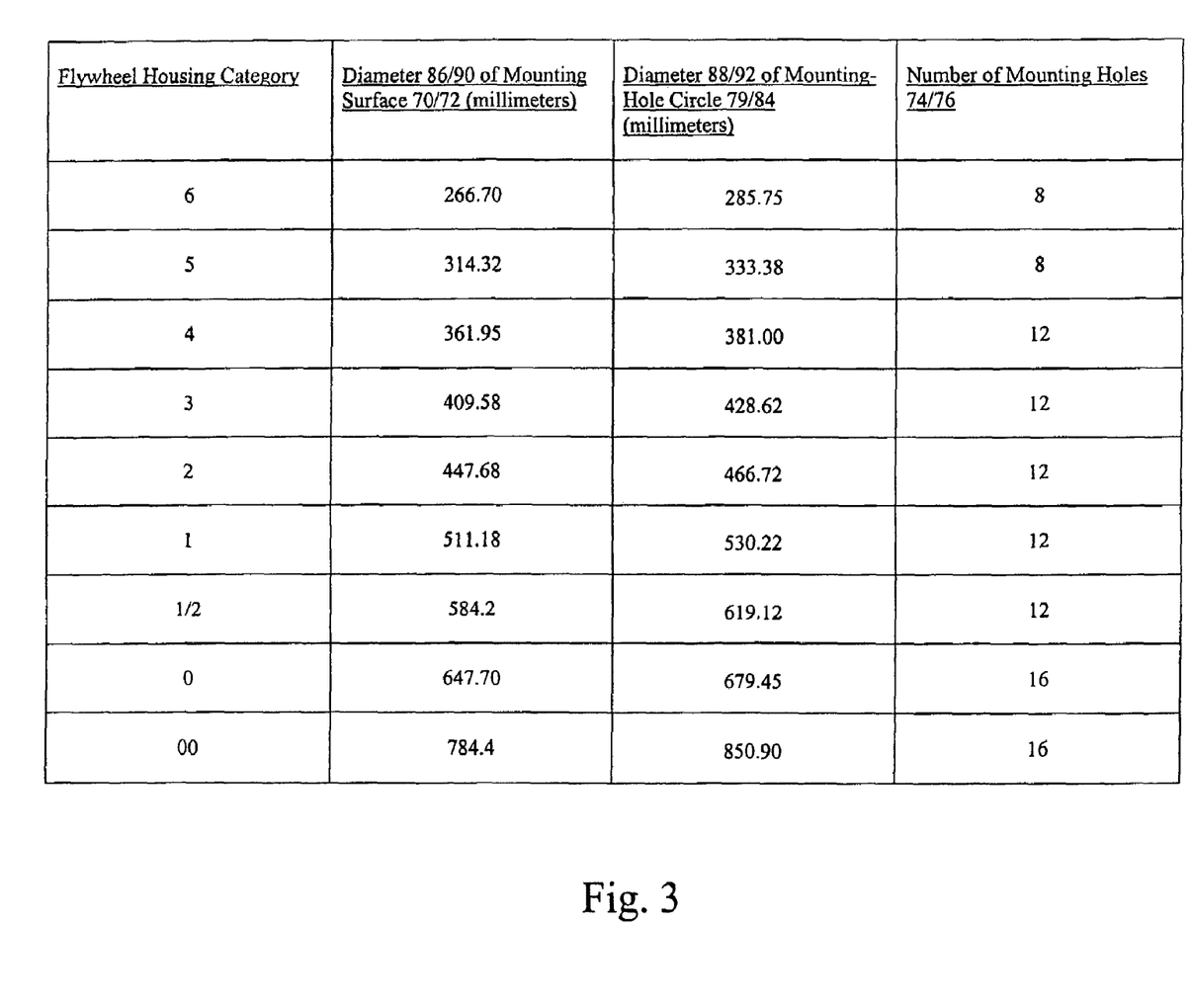
FIG. 3 is a table of specifications for configuring a motor/generator housing according to SAE® and/or ISO standards for mounting of transmissions to prime movers.

FIG. 3 lists specifications for configuring prime-mover-mounting features 30 and/or transmission-mounting features according to SAE® J617, SAE® J1172, ISO 7648, and ISO 7649 for different categories of flywheel housings. In embodiments wherein prime-mover-mounting features 30 are configured in accordance with at least one of SAE® J617 and/or ISO 7649, a diameter 86 of mounting surface 70 and a diameter 88 of mounting-hole circle 79 may be substantially equal to the values listed in FIG. 3 for one category of flywheel housing. Additionally, in such embodiments, the number of mounting holes 74 may be equal to the number of mounting holes listed in FIG. 3 for that category of flywheel housing. For example, prime-mover-mounting features 30 may be configured in accordance with the specifications for a category 1 flywheel housing. In such an embodiment, diameter 86 of mounting surface 70 may be approximately 511.18 millimeters and mounting holes 74 would number 12 on a mounting-hole circle 79 with a diameter of approximately 530.22 millimeters. Similarly, in embodiments wherein transmission-mounting features 38 are configured in accordance with at least one of SAE® J617 and ISO 7649, a diameter 90 of mounting surface 72, a diameter 92 of mounting-hole circle 84, and a number of mounting holes 76 may be in accordance with the values listed in FIG. 3 for a particular category of flywheel housing. While prime-mover-mounting features 30 and/or transmission-mounting features 38 may be configured in accordance with the specifics of present SAE® and/or ISO standards, prime-mover-mounting features 30 and/or transmission-mounting features 38 may also, in the future, be configured in accordance with future SAE® and/or ISO standards for mounting transmissions to prime movers.

Figure 4:
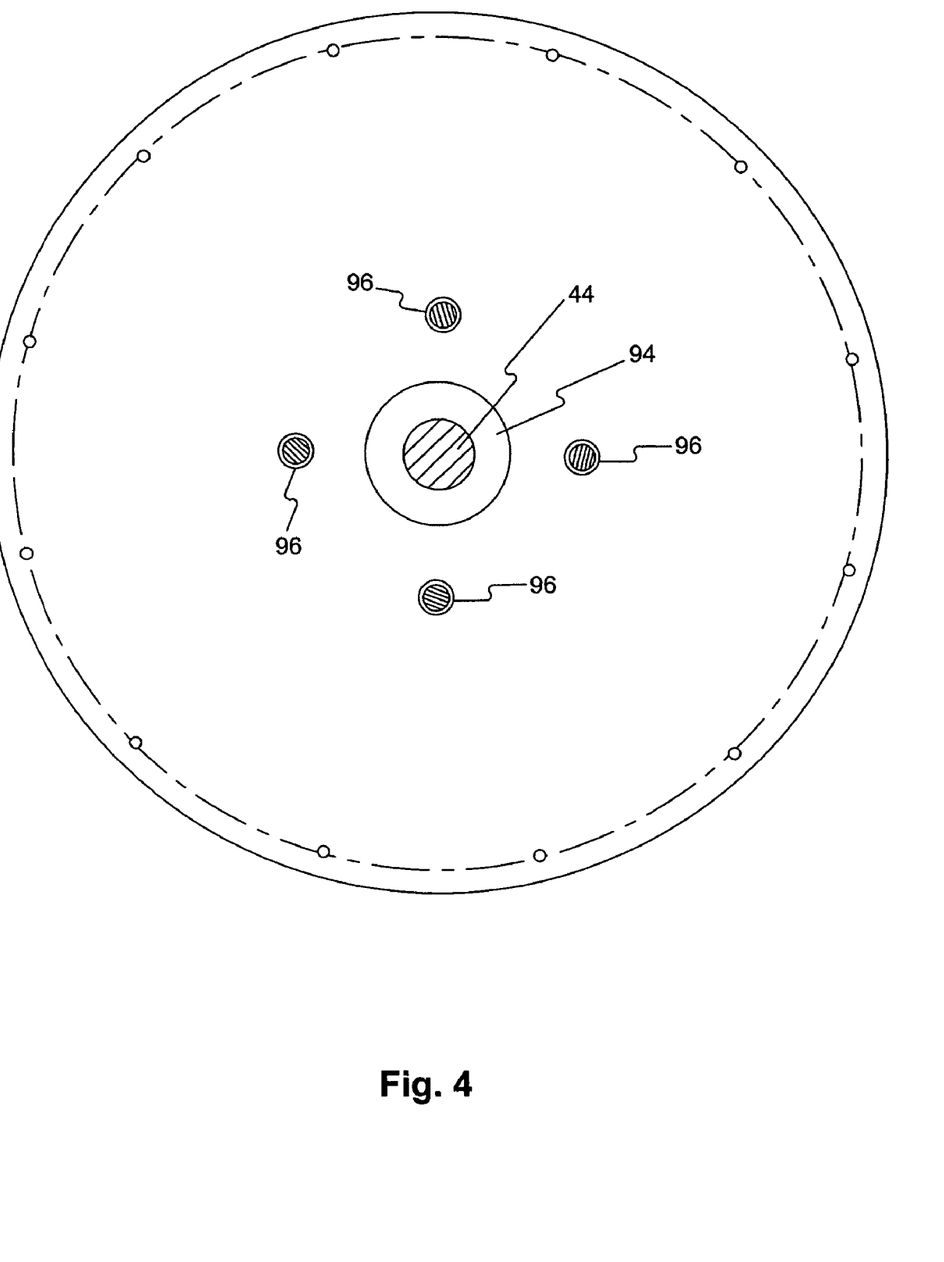
FIG. 4 is a sectional illustration of the embodiment shown in FIGS. 1 and 2A-2G, through line 4-4 of FIG. 1.

FIG. 4 shows one embodiment of second adapter component 42 in greater detail. Second adapter component 42 may extend from mounting surface 73 across at least a portion of opening 81 in motor/generator housing 24. Second adapter component 42 may leave at least a portion of opening 81 exposed, such that transmission input shaft 44 may extend therethrough. In some embodiments, second adapter component 42 may include a transmission-shaft opening 94 through which transmission input shaft 44 may extend. Additionally, second adapter component 42 may include transmission-housing mounting features 96, which may include mounting holes. In some embodiments, such as the one shown in FIGS. 2A and 2F, second adapter component 42 may be a plate.

Second adapter component 42 is not limited to the configuration illustrated in FIGS. 1 and 2F. For example, second adapter component 42 may have a shape other than that of a plate. Additionally, second adapter component 42 may extend only partially across opening 81. In some such embodiments, second adapter component 42 may omit transmission-shaft opening 94, and transmission input shaft 44 may extend through a portion of opening 81 not covered by second adapter component 42.

INDUSTRIAL APPLICABILITY

The disclosed embodiments of motor/generator 16 may have application in any drive train 10 that includes a prime mover 12 and a transmission 18. Additionally, the disclosed embodiments of drive train 10 may have application in any system requiring power.

During operation of drive train 10, prime mover 12 may provide power to variable-slip drive-train coupler 14 through output shaft 20. Variable-slip drive-train coupler 14 may transmit some or all of the power received from prime mover 12 to motor/generator input shaft 31 through the engagement between interior surface 48 of output hub 50 and motor/generator input shaft 31. That power may be transmitted from motor/generator input shaft 31 to rotor 25. Power transmitted to rotor 25 from motor/generator input shaft 31 may be dissipated in at least two ways. Some or all of such power may transfer from rotor 25 to transmission input shaft 44 through transmission-shaft coupler 29. Additionally, motor/generator 16 may operate in a generating mode and convert some or all of the power transmitted to rotor 25 into electricity. Motor/generator 16 may also operate in a motoring mode wherein it utilizes electrical energy to drive rotor 25 about rotor rotation axis 28. When motor/generator 16 operates in a motoring mode, rotor 25 may transmit power to transmission input shaft 44 and, dependant upon the slip rate of variable-slip drive-train coupler 14 and the operating state of prime mover 12, to output shaft 20 of prime mover 12.

Connecting output shaft 20 to rotor 25 through variable-slip drive-train coupler 14 may promote longevity of prime mover 12 and provide for desirable flexibility in operating drive train 10. Variable-slip drive-train coupler 14 may buffer transmission of loads from rotor 25 to output shaft 20, which may reduce undesirable stresses on bearings (not shown) of prime mover 12 that support output shaft 20. Additionally, in embodiments wherein transmission transmission-shaft coupler 29 is fixedly attached to rotor 25, transmission input shaft 44 may support a substantial portion of the weight of rotor 25. This may relieve stress from other components of drive train 10, such as bearings of prime mover 12. Additionally, variable-slip drive-train coupler 14 may allow output shaft 20 and rotor 25 to operate at different speeds, which allows operation of motor/generator 16 to supply power to and/or absorb power from transmission input shaft 44 independent of prime mover 12.

Additionally, the configurations of motor/generator 16 described above may be readily added to an existing drive train 10 that includes a prime mover 12 and a transmission 18 connected to one another through a variable-slip drive-train coupler 14. In order to add motor/generator 16 to such a drive train 10, transmission 18 may be separated from prime mover 12, thereby disengaging transmission input shaft 44 from variable-slip drive-train coupler 14. Variable-slip drive-train coupler 14 may be left attached to output shaft 20 of prime mover 12. Subsequently, motor/generator input shaft 31 may be engaged to variable-slip drive-train coupler 14, such as by sliding motor/generator input shaft 31 into engagement with interior surface 48 of output hub 50. Transmission-shaft coupler 29 may be engaged to transmission input shaft 44, such as by sliding transmission input shaft 44 into engagement with surface 58 of transmission-shaft recess 56 and/or by clamping transmission input shaft 44 between jaws 66 of clamp 63. Thus, embodiments of motor/generator 16 wherein transmission-shaft coupler 29 includes transmission-shaft recess 56 with surface 58 configured to engage transmission input shaft 44 and/or clamp 63 allow one to readily connect rotor 25 to common types of transmission input shaft 44.

Subsequent or simultaneous to engaging motor/generator input shaft 31 to variable-slip drive-train coupler 14, motor/generator housing 24 may be engaged to prime-mover housing 19, such as by installing fasteners (not shown) through mounting holes 74 and securing motor/generator housing 24 to first adapter component 40. Similarly, subsequent or simultaneous to engaging transmission-shaft coupler 29 to transmission input shaft 44, motor/generator housing 24 may be attached to transmission housing 34. Motor/generator housing 24 may be attached to transmission housing 34 by fastening second adapter component 42 to mounting surface 73 through mounting holes 76, inserting transmission input shaft 44 through opening 81 in motor/generator housing 24, and attaching transmission housing 34 to second adapter component 42 through transmission-housing mounting features 96. In embodiments wherein second adapter component 42 includes transmission-shaft opening 94, transmission input shaft 44 may be inserted through transmission-shaft opening 94 when attaching second adapter component 42 to transmission housing 34. Second adapter component 42 may be attached to motor/generator housing 24 first and transmission housing 34 second, or vice versa.

Figure 5:
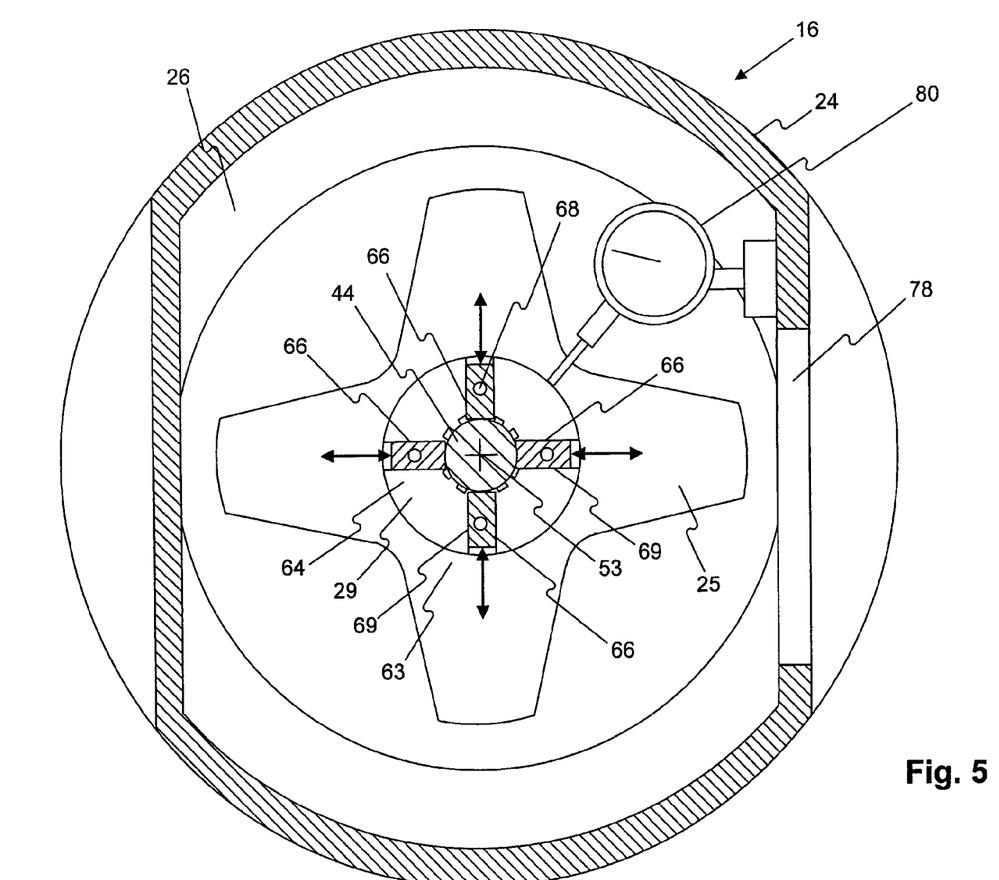
FIG. 5 is a sectional illustration of the embodiment shown in FIGS. 1 and 2A-2F, through line 5-5 of FIG. 1, with the addition of a measuring tool for checking assembly.

In certain embodiments, after motor/generator housing 24 is attached to transmission housing 34, clamp 63 may be used to adjust the position of rotor 25 in directions perpendicular to transmission input shaft 44. Such embodiments include configurations wherein clamp 63 is fixedly engaged to other portions of transmission-shaft coupler 29 and transmission-shaft coupler 29 is fixedly engaged to rotor 25 with transmission-shaft axis 53 substantially aligned to rotor rotation axis 28. As is shown in FIG. 5, once motor/generator housing 24 is mounted to transmission housing 34, rotor 25, clamp 63, and transmission input shaft 44 may be accessed through an opening 78 in motor/generator housing 24. A measuring tool 80 may be used to measure the run-out of rotor 25 with respect to rotor rotation axis 28. Thereafter, in embodiments including at least three jaws 66 at different angular positions around transmission-shaft axis 53 and rotor rotation axis 28 and allowing independent adjustment of jaws 66, clamp 63 may be utilized to reduce the run-out of rotor 25 with respect to rotor rotation axis 28. This may be accomplished by loosening certain jaws 66 and tightening other jaws 66 to shift rotor 25 with respect to rotor rotation axis 28. Play between rotor 25 and motor/generator housing 24, such as play resulting from slop in ball bearing 43, may allow for such shifting of rotor 25 with respect to rotor rotation axis 28. Thus, clamp 63 may allow one to balance rotor 25 on transmission input shaft 44. Once an individual adjusting the clamp is satisfied with the position of rotor 25 with respect to rotor rotation axis 28, locks 68 may be activated to fix the position of jaws 66 with respect to base 64 of clamp 63.

It will be apparent to those skilled in the art that various modifications and variations can be implemented with drive train 10 and motor/generator 16 without departing from the scope of the disclosure. Other embodiments will be apparent to those skilled in the art from consideration of the specification and practice of drive train 10 and motor/generator 16. It is intended that the disclosure of these embodiments be considered as exemplary only, with a true scope of the disclosed embodiments being indicated by the following claims and their equivalents.

What is claimed is:

1. A method of assembling a drive train, which drive train includes a transmission with a transmission housing and a transmission input shaft, a prime mover with an output shaft, and a motor/generator with a motor/generator housing and a rotor mounted at least partially within the motor/generator housing, which rotor is rotatable about a rotor rotation axis, the method comprising:
   connecting the rotor to the transmission input shaft;
   connecting the rotor to the output shaft of the prime mover;
   mounting the motor/generator housing to the transmission housing by mounting an adapter component to the motor/generator housing and mounting the adapter component to the transmission housing;
   wherein the motor/generator includes a transmission-shaft coupler that is drivingly coupled to the rotor;
   the transmission-shaft coupler including a clamp with a plurality of adjustable jaws; and
   connecting the rotor to the transmission input shaft including clamping the transmission-shaft coupler to the transmission input shaft by:
   position the transmission input shaft between the jaws of the clamp: and
   adjusting the jaws of the clamp toward the transmission input shaft until the transmission input shaft is clamped between the jaws of the clamp.

2. The method of claim 1, wherein mounting the motor/generator housing to the transmission housing includes:
   mounting the adapter component to a mounting surface of the motor/generator housing such that the adapter component extends across at least a portion of an opening in the motor/generator housing; and
   inserting the transmission input shaft through a portion of the opening in the motor/generator housing that the adapter component leaves exposed.

3. The method of claim 2, wherein inserting the transmission input shaft through a portion of the opening in the motor/generator housing that the adapter component leaves exposed includes inserting the transmission input shaft through a transmission-shaft opening of the adapter component.

4. The method of claim 3, wherein the adapter component is a plate.

5. The method of claim 1, wherein the transmission-shaft coupler and a base of the clamp are fixedly attached to the rotor prior to clamping the transmission-shaft coupler to the transmission input shaft.

6. The method of claim 1, wherein:
a base of the clamp is fixedly attached to the rotor with the jaws of the clamp disposed at different angular positions about the rotor rotation axis; and
the method further includes:
adjusting the jaws of the clamp in such a manner to reduce the run-out of the rotor with respect to the rotor rotation axis.

7. The method of claim 1, wherein:
the motor/generator includes a motor/generator input shaft that is drivingly coupled to the rotor; and
connecting the rotor to the output shaft of the prime mover includes engaging the motor/generator input shaft to an interior surface of a variable-slip drive-train coupler, such that the motor/generator input shaft is drivingly coupled to the variable-slip drive-train coupler.

8. The method of claim 1, further including:
attaching the motor/generator housing to a prime-mover housing of the prime mover.

9. A drive train, comprising:
a prime mover;
a variable-slip drive-train coupler engaged to an output shaft of the prime mover;
a transmission with an input shaft;
a motor/generator, including:
a motor/generator housing;
a stator mounted to the motor/generator housing;
a rotor mounted to the motor/generator housing and rotatable about a rotor rotation axis;
a motor/generator input shaft that is drivingly coupled to the rotor and that is engaged to an interior surface of the variable-slip drive-train coupler in such a manner to drivingly couple the motor/generator input shaft and the variable-slip drive-train coupler; and
wherein the rotor is drivingly coupled to the transmission input shaft.

10. The drive train of claim 9, wherein:
the motor/generator further includes a transmission-shaft coupler that is drivingly coupled to the rotor; and
the transmission-shaft coupler includes a transmission-shaft recess with a surface that engages the transmission input shaft, such that the transmission-shaft coupler is drivingly coupled to the transmission input shaft.

11. The drive train of claim 10, wherein the surface of the transmission-shaft recess and the interior surface of the variable-slip drive-train coupler are configured such that each could drivingly engage the transmission input shaft.

12. The drive train of claim 11, wherein the transmission-shaft recess extends along a transmission-shaft axis that is substantially aligned with the rotor rotation axis.

13. The drive train of claim 10, wherein the transmission-shaft coupler is fixedly attached to the rotor and the transmission-shaft recess extends along a transmission-shaft axis that is substantially aligned with the rotor rotation axis.

14. The drive train of claim 10, wherein a circumference of the surface of the transmission-shaft recess that engages the transmission input shaft has substantially the same shape and size as a circumference of the interior surface of the variable-slip drive-train coupler that engages the motor/generator input shaft.

15. The drive train of claim 9, wherein the motor/generator input shaft and the transmission input shaft are configured such that each could drivingly engage the interior surface of the variable-slip drive-train coupler.

16. The drive train of claim 15, wherein the motor/generator input shaft is fixedly engaged to the rotor and extends along the rotor rotation axis.

17. The drive train of claim 9, wherein a circumference of the transmission input shaft has substantially the same shape and size as a circumference of the motor/generator input shaft that engages the interior surface of the variable-slip drive-train coupler.

18. The drive train of claim 9, wherein:
the motor/generator housing includes prime-mover-mounting features, through which the motor/generator housing is attached to a prime-mover housing of the prime mover; and
the motor/generator housing includes transmission-mounting features through which the motor/generator is mounted to a transmission housing of the transmission.

19. The drive train of claim 9, wherein:
the motor/generator housing includes prime-mover-mounting features, through which the motor/generator housing is mounted to a prime-mover housing of the prime mover; and
the prime-mover-mounting features are in accordance with at least one of SAE® standards and ISO standards for mounting transmissions to prime movers.

20. The drive train of claim 19, wherein the prime-mover-mounting features are in accordance with at least one of SAE® standard J617, SAE® standard J1172, and ISO standard ISO 7649.

21. The drive train of claim 9, wherein:
the motor/generator housing further includes transmission-mounting features, through which the motor/generator housing is mounted to a transmission housing of the transmission; and
the transmission-mounting features are in accordance with at least one of SAE® standards and ISO standards for mounting transmissions to prime movers.

22. The drive train of claim 9, further including:
an adapter component connected between the motor/generator housing and a transmission housing of the transmission.

23. The drive train of claim 9, wherein the interior surface of the variable-slip drive-train coupler that the motor/generator input shaft is engaged to is an interior surface of an output hub of the variable-slip drive-train coupler.

24. The drive train of claim 9, wherein:
the motor/generator further includes a transmission-shaft coupler that is drivingly coupled to the rotor;
the transmission-shaft coupler includes a clamp with a plurality of jaws; and
the transmission input shaft is clamped between the jaws of the clamp.

25. The drive train of claim 9, wherein the transmission-shaft coupler is fixedly engaged to the rotor and the transmission input shaft supports a substantial portion of the weight of the rotor.

* * * * *

UNITED STATES PATENT AND TRADEMARK OFFICE
CERTIFICATE OF CORRECTION

PATENT NO. : 7,370,716 B2 Page 1 of 1
APPLICATION NO. : 11/141064
DATED : May 13, 2008
INVENTOR(S) : Hickam

It is certified that error appears in the above-identified patent and that said Letters Patent is hereby corrected as shown below:

Please correct the Claim as follows:
Column 10, line 46, in claim 1, delete "position" and insert -- positioning --.

Column 10, line 47, in claim 1, delete "clamp:" and insert -- clamp; --.

Signed and Sealed this

Fourth Day of November, 2008

JON W. DUDAS
*Director of the United States Patent and Trademark Office*